(12) United States Patent
Ernst et al.

(10) Patent No.: US 12,071,029 B2
(45) Date of Patent: Aug. 27, 2024

(54) CURRENT COLLECTOR ARRANGEMENT FOR A VEHICLE

(71) Applicant: Siemens Mobility Austria GmbH, Vienna (AT)

(72) Inventors: Marco Ernst, Graz (AT); Gerald Fürlinger, Graz (AT); Harald Steinbach, Graz (AT); Erhard Rossmann, Pischelsdorf (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 1051 days.

(21) Appl. No.: 16/969,252

(22) PCT Filed: Feb. 12, 2019

(86) PCT No.: PCT/EP2019/053390
§ 371 (c)(1),
(2) Date: Aug. 12, 2020

(87) PCT Pub. No.: WO2019/158507
PCT Pub. Date: Aug. 22, 2019

(65) Prior Publication Data
US 2021/0001727 A1    Jan. 7, 2021

(30) Foreign Application Priority Data
Feb. 14, 2018   (AT) .............................. A 50133/2018

(51) Int. Cl.
*B60L 5/38*    (2006.01)
*B60L 5/08*    (2006.01)
(Continued)

(52) U.S. Cl.
CPC    *B60L 5/38* (2013.01); *B60L 5/08* (2013.01); *B60L 5/30* (2013.01); *B60L 5/36* (2013.01); *B60L 5/39* (2013.01)

(58) Field of Classification Search
CPC ...... B60L 5/38; B60L 5/39; B60L 5/30; B60L 5/36; B60L 5/08
(Continued)

(56) References Cited

U.S. PATENT DOCUMENTS 1,354,790 A * 10/1920 Whiting .................... B60L 5/38
191/49
3,847,256 A * 11/1974 Zurek ....................... B60L 5/38
191/59

(Continued)

FOREIGN PATENT DOCUMENTS

CN         1764559 B  *  5/2010  ................ B60L 5/39
CN       203485776       3/2014
(Continued)

*Primary Examiner* — S. Joseph Morano
*Assistant Examiner* — James William Jones
(74) *Attorney, Agent, or Firm* — Cozen O'Connor

(57) ABSTRACT

A current-collector arrangement for a vehicle, said arrangement includes a current collector with a contact shoe for collecting current from a conductor rail, wherein the current collector is connected to the vehicle in sprung fashion where, in order to create advantageous design conditions, the current collector and the vehicle should have arranged between them a carrier, which is connected to the vehicle via a first spring and a second spring and also a joint, and where the first spring and the second spring should each have at least one reserve spring-length region for extraordinary deflections of the current collector, and where absolute values of the extraordinary deflections exceed absolute values of ordinary deflections of the current collector such that a deflection of the current collector achieved in an extraordinary operating state is reversible and need not be restored manually.

14 Claims, 2 Drawing Sheets

(51) Int. Cl.
*B60L 5/30* (2006.01)
*B60L 5/36* (2006.01)
*B60L 5/39* (2006.01)

(58) Field of Classification Search
USPC ..................................................... 191/49, 50
See application file for complete search history.

(56) References Cited

U.S. PATENT DOCUMENTS

| | | | | |
|---|---|---|---|---|
| 4,042,081 A | * | 8/1977 | Pier | ............ B60L 3/04 |
| | | | | 191/8 |
| 4,108,288 A | * | 8/1978 | Manabe | .............. B60L 5/38 |
| | | | | 191/49 |
| 4,567,335 A | * | 1/1986 | Griffiths | .............. B60L 5/08 |
| | | | | 191/60.3 |
| 2011/0139561 A1 | * | 6/2011 | Sommer | ............ B60L 5/39 |
| | | | | 191/49 |

FOREIGN PATENT DOCUMENTS

| | | | | | |
|---|---|---|---|---|---|
| CN | 203485776 | U | * | 3/2014 | |
| CN | 105383308 | A | * | 3/2016 | |
| CN | 205136207 | U | * | 4/2016 | |
| CN | 106965681 | | | 7/2017 | |
| CN | 106965681 | A | * | 7/2017 | |
| CN | 107225976 | A | * | 10/2017 | |
| DE | 2235723 | | | 1/1974 | |
| DE | 2352102 | | | 4/1975 | |
| DE | 102004019252 | B3 | * | 6/2005 | ............... B60L 5/39 |
| DE | 202005002376 | U1 | * | 6/2005 | ............... B60L 5/38 |
| EP | 0080324 | A2 | * | 11/1982 | |
| EP | 0080324 | | | 6/1983 | |
| KR | 20010105809 | A | * | 5/2000 | |
| KR | 20010105809 | | | 11/2001 | |
| WO | WO-2012043798 | A1 | * | 4/2012 | ............... B60L 5/20 |
| WO | WO-2012143357 | A2 | * | 10/2012 | ............... B60L 5/22 |
| WO | WO-2015110325 | A1 | * | 7/2015 | ............... B60L 5/08 |
| WO | 2016/071065 | | | 5/2016 | |
| WO | WO-2016071065 | A1 | * | 5/2016 | ............... B60L 5/39 |

* cited by examiner

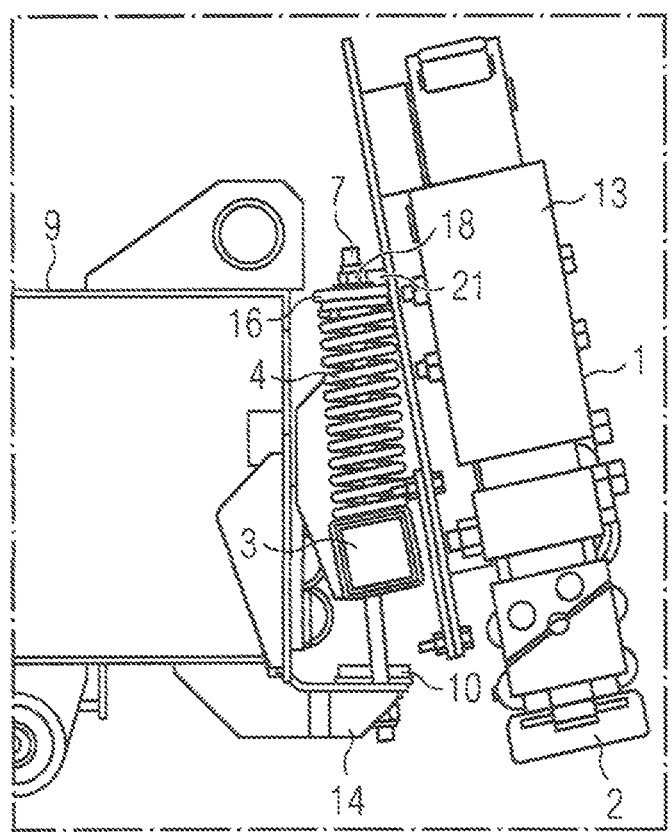

CURRENT COLLECTOR ARRANGEMENT FOR A VEHICLE

CROSS-REFERENCE TO RELATED APPLICATIONS

This is a U.S. national stage of application No. PCT/EP2019/053390 filed 12 Feb. 2019. Priority is claimed on Austrian Application No. A50133/2018 filed 14 Feb. 2018, the content of which is incorporated herein by reference in its entirety.

BACKGROUND OF THE INVENTION

1. Field of the Invention

The invention relates to a current-collector arrangement for a vehicle, which has a current collector with a contact shoe for collecting current from a conductor rail, where the current collector is connected to the vehicle in sprung manner.

2. Description of the Related Art

Current collectors, the contact shoes of which are pressed onto conductor rails, must be formed such that they can be raised to prevent an impermissible wheel offloading of the vehicle, i.e., an impermissible reduction in a wheel contact force, which brings about a reduction in derailing safety. Wheel offloadings occur for example in the event of height errors or icing on the conductor rail.

To prevent impermissible wheel offloadings use is frequently made of a slip clutch, which in an ordinary operating state presses the current collector onto the conductor rail and in an extraordinary operating state triggers it, i.e., releases or raises the current collector. The disadvantage of this approach in its familiar form is that the slip clutch is irreversible in its effect, i.e., the current collector has to be guided manually back onto the conductor rail or set up free of play after it is released (i.e., after the slip clutch is triggered).

To prevent the slip clutch from being triggered in error (e.g. in the event of high vertical accelerations that are not conditioned by the extraordinary operating state), a high trigger force is hence frequently set for the slip clutch, as a result of which the current collector or its components and bearing devices for connecting the current collector to the vehicle are under great strain and the wheel offloading may increase sharply within permissible limits.

According to the prior art, WO 2016/071065 A1, for example, describes a current collector for a rail vehicle. A swinging arm with a contact shoe is provided, which can be pressed against a conductor rail from below. Furthermore, a stop is arranged, by means of which deflections of the swinging arm can be restricted. This stop can be positioned as a function of strain in operation.

SUMMARY OF THE INVENTION

In view of the foregoing, it is therefore an object of the invention is to provide a current collector arrangement that is further developed in comparison to the prior art.

This and other objects and advantages are achieved in accordance with the invention by a current collector arrangement in which a carrier is arranged between the current collector and the vehicle, and is connected to the vehicle via a first spring and a second spring as well as a joint, where the first spring and the second spring each have at least one reserve spring-length region for extraordinary deflections of the current collector, and where absolute values of the extraordinary deflections exceed absolute values of ordinary deflections of the current collector.

Because the carrier is coupled to the vehicle via the first spring and the second spring and spring rigidities and bias forces are adjusted accordingly, a defined amount of movement of the current collector is given. As a result, an advantageous adjustability or adjustment of the current collector arrangement to anticipated accelerations or decelerations in the region of the current collector (e.g., vertical accelerations because of track layouts) is achieved. If the track layout of a particular stretch of track or a particular track network, for example, means a high vertical acceleration level is to be expected, then the bias forces are selected to be correspondingly high. Consequently, the current collector follows a conductor rail profile correctly, i.e., thereby preventing the current collector from lifting off from a conductor rail for lengthy periods. Compensation for vertical accelerations because of a track layout with corresponding tolerances corresponds to an ordinary operating state of the current collector arrangement.

An extraordinary operating state of the current collector arrangement may exist, for example, in the event of icing on the conductor rail or a height error in the conductor rail. In an extraordinary operating state, higher accelerations or decelerations may occur than in an ordinary operating state. The first spring and the second spring hence have at least one reserve spring-length region, and can therefore be further compressed or expanded beyond the amount of compression or expansion that occurs because of an appropriate adjustment of the first spring and the second spring in ordinary operating states, in order to be able to compensate for extraordinary distances or changes in distance between the current collector and the conductor rail. Compressions and expansions of the first spring and the second spring in ordinary operating states result in ordinary deflections of the current collector, while compressions and expansions of the first spring and the second spring in extraordinary operating states result in extraordinary deflections of the current collector.

The ordinary deflections and the extraordinary deflections can in principle occur upward and downward (i.e., in a mathematically positive and negative direction), for which reason they are, from a mathematical perspective, absolute values of the extraordinary deflections that exceed absolute values of the ordinary deflections.

Because of the first spring and the second spring, it is possible to dispense with slip clutches, for which correspondingly high trigger forces are to be provided, in order to prevent an unintentional triggering in ordinary operating states. As a result, the carrier is in turn relieved of strain and sharply increasing wheel offloadings of the vehicle are prevented.

Furthermore, dispensing with slip clutches results in a simple, robust, low-maintenance and thus inexpensive current collector arrangement. Visual inspections and manually re-pressing the current collector arrangement, as is necessary after triggering a slip clutch, can be dispensed with, because both ordinary deflections of the current collector and extraordinary deflections of the current collector are reversible because of the first spring and the second spring.

It is advantageous if the first spring has a first biasing device and the second spring has a second biasing device.

Owing to this measure, the bias forces of the first spring and the second spring can also be adjusted or readjusted retrospectively (for example, during maintenance or repair work). As a result, it is possible, for example, to retrospectively adjust the current collector arrangement to altered track layouts. This may be necessary if the vehicle is e.g., deployed on stretches of track that are new with respect to its original operational spectrum.

Furthermore, the bias forces can be readjusted if operational experience shows that, for example, in extraordinary operating states higher accelerations or decelerations than originally assumed occur in the region of the current collector arrangement.

An advantageous solution is achieved if the first spring is arranged around a first rod and the second spring is arranged around a second rod, where the first rod and the second rod are formed as guides of the carrier and are pivotably connected to the vehicle.

With the first rod and the second rod, a collection function for the first spring and the second spring and at the same time a guide function for the carrier is brought about. As a result, a simplification in configuration and a reduction in weight and cost is achieved.

An advantageous embodiment is obtained if the joint is formed as a center pin.

It is further advantageous if the carrier rests on a first elastic element and a second elastic element that are connected to the vehicle.

By forming the joint as a center pin an arrangement which is robust and low-maintenance compared, for example, to an elastic joint is achieved. Because of the imposed condition of the first elastic element and the second elastic element, a high mechanical stability and a vibrational decoupling of the current collector arrangement from the vehicle or an advantageous damping effect is achieved.

It is advantageous if the carrier has a recess through which at least one vehicle component is guided. As a result, an especially good/optimal utilization of an existing installation space budget is achieved.

An advantageous solution is achieved if the contact shoe of the current collector is connected to a base frame of the current collector via at least a third spring, where the third spring has a lower level of rigidity than the first spring and the second spring.

By this measure, small changes in a height position of the conductor rail or small height errors are compensated for, without the first spring, the second spring and the carrier being deflected.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described in greater detail below using exemplary embodiments, in which:

FIG. 3 is a side view of an exemplary embodiment of a current collector arrangement, where a current collector has a deflected position and location in accordance with the invention.

DETAILED DESCRIPTION OF THE EXEMPLARY EMBODIMENT

Figure 1:
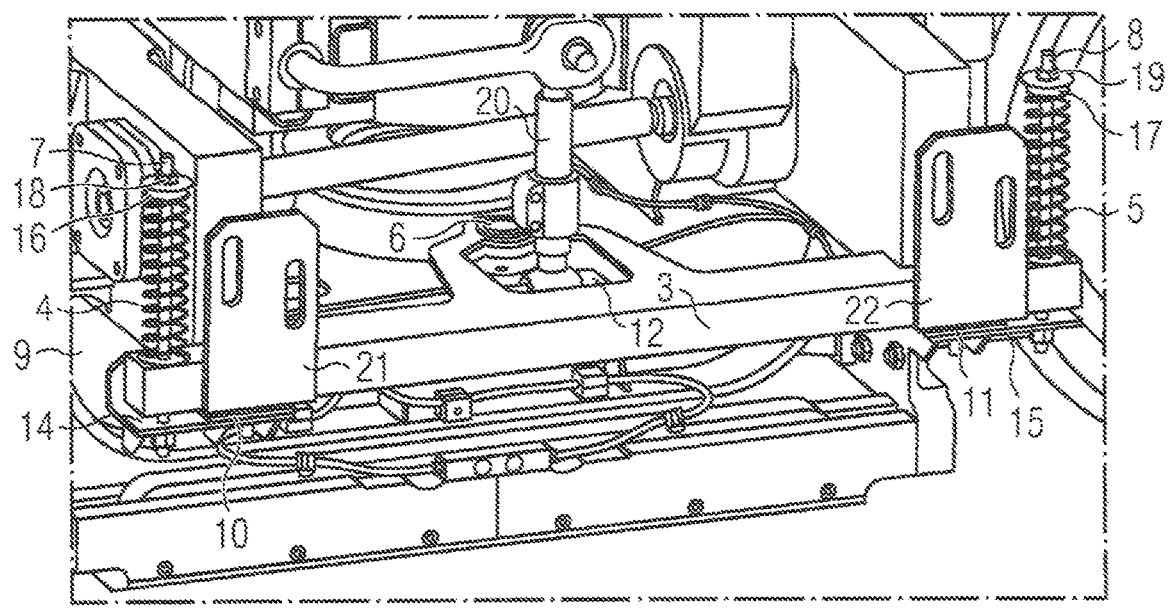
FIG. 1 is an illustration of an oblique projection of a carrier, connected to a bogie frame, of an exemplary embodiment a current collector arrangement in accordance with the invention.

A carrier 3, represented in FIG. 1 as an oblique projection, of an exemplary embodiment of an inventive current collector arrangement, is connected via a joint 6, which is formed as a center pin, to a bogie frame 9 of a bogie of a rail vehicle and rests on a first elastic element 10 and a second elastic element 11, which are formed as buffers. The first elastic element 10 is connected to a first bracket 14, and the second elastic element 11 is connected to a second bracket 15. The first bracket 14 and the second bracket 15 are welded to the bogie frame 9.

In accordance with the invention, it is also conceivable to couple the carrier 3 to a body of the rail vehicle, where in this case the joint 6, the first bracket 14 and the second bracket 15 are connected to the body.

A first rod 7 is pivotably mounted on the first bracket 14 about an axis that extends parallel to a longitudinal axis of the bogie or parallel to the direction of travel of the bogie.

A second rod 8 is provided on the second bracket 15, which likewise is pivotably mounted about an axis that extends parallel to a longitudinal axis of the bogie or parallel to the direction of travel of the bogie.

Arranged around the first rod 7 is a first spring 4 which, on an underside, is connected to the carrier 3 and, on an upper side, is connected to a first end stop 16. Arranged around the second rod 8 is a second spring 5 which, on an underside, is connected to the carrier 3 and, on an upper side, is connected to a second end stop 17.

In the region of the upper side of the first rod 7 or the first spring 4, a first threaded bolt 18 is provided on the first rod 7, and is guided on a first thread (not visible in FIG. 1) of the first rod 7. In the region of the upper side of the second rod 8 or the second spring 5 a second threaded bolt 19 is provided on the second rod 8, and is guided on a second thread (not visible in FIG. 1) of the second rod 8. By tightening the first threaded bolt 18 against the first spring 4 the first spring 4 is biased, by tightening the second threaded bolt 19 against the second spring 5 the second spring 5 is biased.

With the first threaded bolt 18 and the second threaded bolt 19, bias forces of the first spring 4 and the second spring 5 are thus generated. The first rod 7 and the first threaded bolt 18 are thus formed as a first biasing device for the first spring 4, and the second rod 8 and the second threaded bolt 19 are thus formed as a second biasing device for the second spring 5.

To reduce the bias forces, the first threaded bolt 18 and the second threaded bolt 19 are twisted such that the tension is released from the first spring 4 and the second spring 5.

The carrier 3 has a recess 12, through which components of an anti-roll stabilizer 20 of the rail vehicle are guided. The recess 12 is dimensioned such that, even in the event of deflections of the carrier 3, no collisions can occur between the anti-roll stabilizer 20 and the carrier 3.

Figure 2:
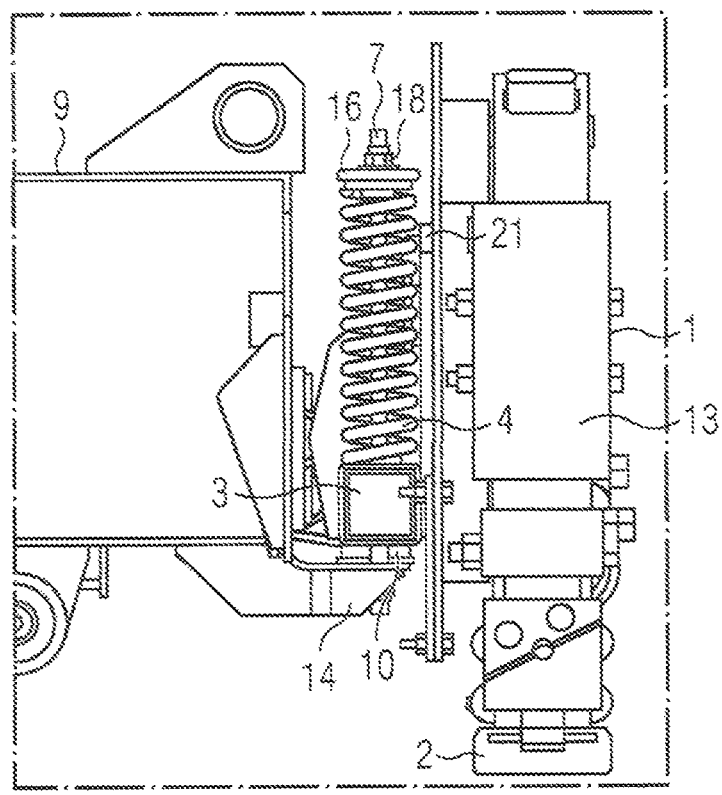
FIG. 2 is a side view of an exemplary embodiment of a collector arrangement, where a current collector has a nominal position and location in accordance with the invention.

Furthermore, the carrier 3 has a first adapter 21 and a second adapter 22, to which a current collector 1 (not represented in FIG. 1) is connected, but which is shown in FIG. 2 and FIG. 3. Because of the bias forces of the first spring 4 and the second spring 5, the current collector 1 is pressed from above onto a conductor rail (not shown) and follows its height profile, i.e., the carrier 3 and the current collector 1 can deflect.

FIG. 2 shows a side view of an exemplary embodiment of an inventive current collector arrangement, where a current collector 1 fastened to a carrier 3 via a first adapter 21 and a second adapter 22 shown in FIG. 1 has a nominal position and location. In this position the carrier 3 and the current collector 1 are vertically oriented and the current collector 1 presses with a defined force from above onto a conductor rail (not shown).

The current collector 1 has a base frame 13, to which a contact shoe 2 is connected via a third spring (not shown for purposes of clarity). The contact shoe 2 contacts the conductor rail and because of the third spring, which has a lower level of rigidity than a first spring 4 and a second spring 5, which are arranged on the carrier 3, can compensate for small track layout errors and small height errors in the conductor rail, which result in relative movements between the current collector arrangement and the conductor rail. In accordance with the invention, it is also possible to dispense with the third spring, however.

The carrier 3 is connected or rotatably mounted to a bogie frame 9 of a bogie of a rail vehicle via a joint 6 that is described in connection with FIG. 1, and rests on a first elastic element 10 of a first bracket 14 and a second elastic element 11, shown in FIG. 1, of a second bracket 15. The first bracket 14 and the second bracket 15 visible in FIG. 1 are welded to the bogie frame 9.

A first spring 4 and a second spring 5, which is visible in FIG. 1, are provided on the carrier 3, and each have bias forces of 2 kN. The first spring 4 is arranged around a first rod 7, and the second spring 5 is arranged around a second rod 8, which is represented in FIG. 1. The first rod 7 is mounted in an articulated manner on the first bracket 14, and the second rod 8 is mounted in an articulated manner on the second bracket 15. The first rod 7 and the second rod 8 are hence pivotably connected to the bogie about an axis appearing projected in FIG. 2.

Furthermore, the first rod 7 and the second rod 8 are guided through the carrier 3 and, in the event of pivoting movements of the carrier 3, act as a guide for the carrier 3. The first rod 7 further has a first end stop 16 and a first threaded bolt 18 formed as a first biasing device for the first spring 4, and the second rod 8 has a second end stop 17 visible in FIG. 1 and a second threaded bolt 19 formed as a second biasing device for the second spring 5 and likewise shown in FIG. 1.

The first threaded bolt 18 and the second threaded bolt 19 are described in connection with FIG. 1 with respect to their functionality.

The first spring 4 is connected on its underside to the carrier 3 and, on its upper side, to the first end stop 16. The second spring 5 is connected on its underside to the carrier 3 and, on its upper side, to the second end stop 17.

When a height difference between the current collector arrangement and the conductor rail decreases, for example, because of icing on the conductor rail or a height error in the conductor rail, the carrier 3 pivots upward with the current collector 1. As a result, the first spring 4 and the second spring 5 are tensioned or spring forces in the first spring 4 and the second spring 5 are increased. In this case, a maximum spring force of 8 kN and a maximum vertical deflection of the current collector of 50.8 mm can be achieved. Ordinary deflections because of track layout tolerances and tolerances with respect to height differences of the conductor rail are up to 20 mm for this exemplary embodiment of the current collector 1. Over and above the ordinary deflections of up to 20 mm, until the maximum vertical deflection of 50.8 mm is reached, a reserve spring-length region of 30.8 mm is therefore provided for extraordinary deflections of the current collector 1 (e.g., because of icing on the conductor rail).

If the height difference increases again, then the carrier 3 again pivots downward because of the spring forces in the first spring 4 and the second spring 5 and is applied to the first elastic element 10 and the second elastic element 11. The carrier 3 is thus reset and the current collector 1 rests on the conductor rail, without maintenance work being necessary to reset the current collector arrangement.

In accordance with the invention, it is also conceivable that, in the nominal position and location of the carrier 3, the carrier 3 does not rest on the first elastic element 10 and the second elastic element 11, but that a spacing is provided between the carrier 3, on the one hand, and the first elastic element 10 and the second elastic element 11, on the other hand, where the spacing acts as a further reserve spring-length region for extraordinary deflections of the current collector 1 downward (e.g., when height differences increase between the current collector arrangement and the conductor rail because of height errors in the conductor rail).

FIG. 3 shows a side view of an inventive current collector arrangement, where a current collector 1 fastened to a carrier 3 has a deflected position and location. The current collector arrangement corresponds to the embodiment that is also disclosed in FIG. 2. The same reference characters are hence used in FIG. 3 as in FIG. 2.

Because of icing on a conductor rail (not shown), onto which the current collector 1 is pressed with its contact shoe 2, the carrier 3 is pushed upward compared to its nominal position and location shown in FIG. 2, and is twisted counterclockwise about an axis appearing projected in FIG. 3. An extraordinary deflection is represented in FIG. 3, in which the current collector 1 is arranged obliquely and extends from upper left to lower right.

A first spring 4 and a second spring 5 shown in FIG. 1 have spring forces of 8 kN for this extraordinary deflection and the current collector 1 is raised by 50.8 mm compared to the deflection status in FIG. 2. A further raising over and above this 50.8 mm is not possible, a reserve spring-length region referred to in connection with FIG. 2 is fully utilized in this deflection.

If the rail vehicle moves in a region in which the conductor rail no longer has any icing, then the spring forces cause the carrier 3 or the current collector 1 and its contact shoe 2 to be reset to the nominal position and location, i.e., the contact shoe 2 is pressed onto the conductor rail and the first spring 4 and the second spring 5 have spring forces of 2 kN.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A current collector arrangement for a vehicle, which has an upward and downward deflectable current collector with a contact shoe for collecting current from a conductor rail, the current collector being connected to the vehicle in a sprung manner, the arrangement comprising:
   a carrier arranged between the current collector and the vehicle, said carrier being connected to the vehicle via a first vertically extending spring and a second vertically extending spring as well as a joint;
   wherein the first spring and the second spring each have at least one reserve spring-length region for extraordinary deflections of the current collector;
   wherein absolute values of extraordinary deflections exceed absolute values of ordinary deflections of the current collector.

2. The current collector arrangement as claimed in claim 1, wherein the first vertically extending spring includes a first biasing device and the second vertically extending spring includes a second biasing device.

3. The current collector arrangement as claimed in claim 2, wherein the first vertically extending spring is arranged around a first rod and the second vertically extending spring is arranged around a second rod; and wherein the first rod and the second rod are formed as guides of the carrier and are pivotally connected to the vehicle.

4. The current collector arrangement as claimed in claim 2, wherein the carrier is connected to a bogie frame of the vehicle.

5. The current collector arrangement as claimed in claim 2, wherein the carrier is connected to a body of the vehicle.

6. The current collector arrangement as claimed in claim 1, wherein the first vertically extending spring is arranged around a first rod and the second vertically extending spring is arranged around a second rod; and wherein the first rod and the second rod are formed as guides of the carrier and are pivotally connected to the vehicle.

7. The current collector arrangement as claimed in claim 6, wherein the carrier is connected to a bogie frame of the vehicle.

8. The current collector arrangement as claimed in claim 6, wherein the carrier is connected to a body of the vehicle.

9. The current collector arrangement as claimed in claim 1, wherein the carrier is connected to a bogie frame of the vehicle.

10. The current collector arrangement as claimed in claim 1, wherein the carrier is connected to a body of the vehicle.

11. The current collector arrangement as claimed in claim 1, wherein the joint is formed as a center pin.

12. The current collector arrangement as claimed in claim 1, wherein the carrier rests on a first elastic element and a second elastic element which are connected to the vehicle.

13. The current collector arrangement as claimed in claim 1, wherein the carrier includes a recess through which at least one vehicle component is guided.

14. The current collector arrangement as claimed in claim 1, wherein the contact shoe of the current collector is connected to a base frame of the current collector via at least one third spring; and
   wherein the third spring has a lower level of rigidity than the first and second springs.

* * * * *